May 29, 1956 P. L. BLUM 2,747,629
METHOD OF MANUFACTURING TUB STAVES
Original Filed May 9, 1950 3 Sheets-Sheet 1

Inventor
Paul L. Blum
By Herbert J. Jacobi
Attorney

May 29, 1956     P. L. BLUM     2,747,629
METHOD OF MANUFACTURING TUB STAVES
Original Filed May 9, 1950     3 Sheets-Sheet 2

Inventor
Paul L. Blum
By Herbert J. Jacobi
Attorney

May 29, 1956  P. L. BLUM  2,747,629
METHOD OF MANUFACTURING TUB STAVES
Original Filed May 9, 1950  3 Sheets-Sheet 3
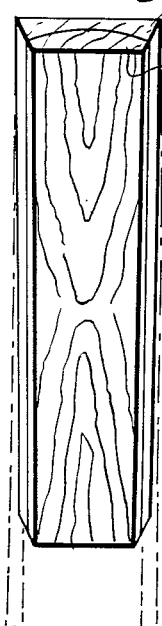
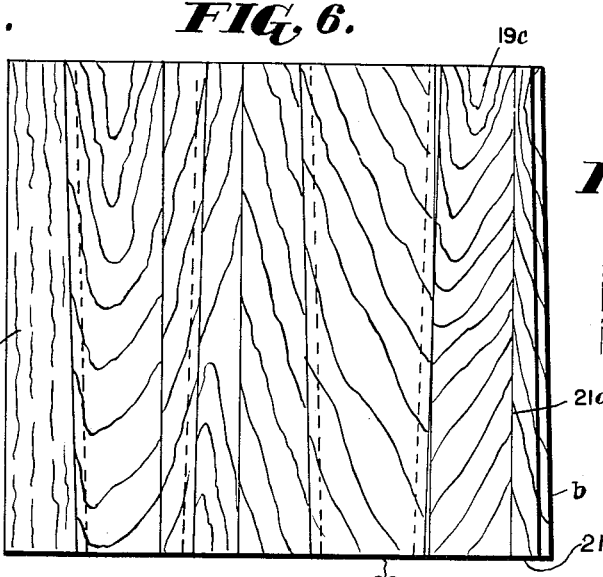
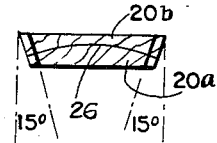
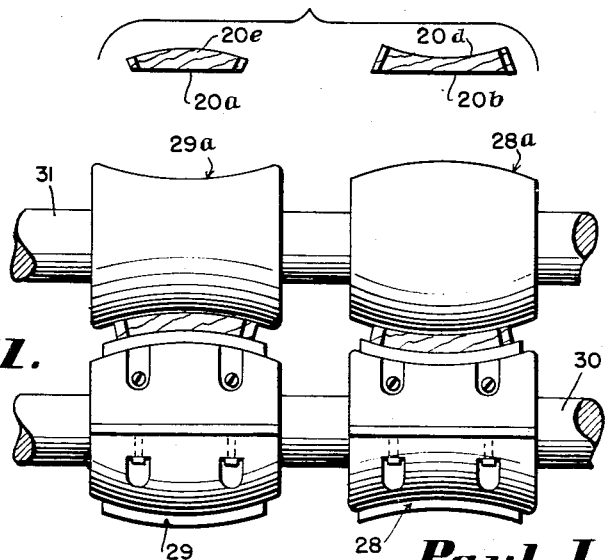
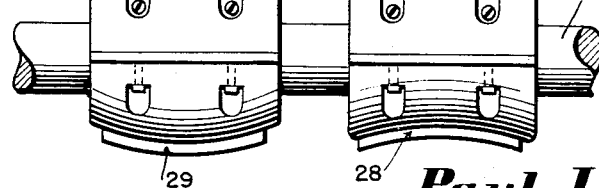
Inventor
Paul L. Blum
By Herbert J. Jacobi
Attorney

United States Patent Office 2,747,629
Patented May 29, 1956

2,747,629

METHOD OF MANUFACTURING TUB STAVES

Paul L. Blum, Marshfield, Wis., assignor to Blum Bros. Box Company, Marshfield, Wis., a corporation of Wisconsin Original application May 9, 1950, Serial No. 160,904, now Patent No. 2,673,585, dated March 30, 1954. Divided and this application February 10, 1954, Serial No. 409,378

5 Claims. (Cl. 144—309)

This invention is directed to the art of making wooden receptacles and pertains particularly to improvements in the manufacture of tubs of tapered form such as are commonly employed in the marketing of butter, lard and other commodities.

A particular object of the present invention is to provide an improved method of producing staves of the correct taper, edge bevel and transverse curvature in an efficient manner and with greater economy than by the presently practiced methods, together with means for carrying out such method.

In the manufacture of staves for butter tubs and similar receptacles, as at present practiced, the method employed embodies a predetermined procedure of cutting the timber to produce incomplete stave pieces of arcuate cross sectional form and having unbeveled parallel longitudinal edges. After the formation of the piece in this manner, each piece is sawed to the desired taper and bevel, the result being the removal from each side of the piece of a sliver having a thickness at one end of about one-half inch, which is discarded. Thus from each stave piece there is removed waste material of the length of the piece having a thickness of about one-half inch and a width equal to the thickness of the stave piece. Where in a large tub producing factory the number of staves used in a year runs into the hundreds of thousands and probably millions, the waste material from the formation of the staves in the manner stated is considerable.

A further object of the present invention is to provide an improved method of manufacturing the tub staves whereby the sequence of operations is changed from that at present employed so that the staves are initially formed with a proper taper and bevel and the removal of waste material from the sides of the pieces is avoided, as a result of which material previously cut off and thrown away as waste now goes into the completed stave and wastage is reduced to a minimum.

Another object of the invention is to provide a novel method of manufacturing staves for tapered butter tubs and similar receptacles from material which at the present time constitutes wastage from door and window frame and sash mills, wherein such wastage comprises pieces of wood stock of from fifteen and one-half to sixteen and one-half inches in length and varying in thickness from one inch to one and five thirty seconds inches and in width varying from two and one-half inches to five inches or more, by a novel process of joining such pieces into a preliminary blank and then taper sawing such blank on a machine of novel construction to produce an initial properly beveled and tapered piece from which two finished staves are produced.

Other objects and advantages of the invention will become apparent as the description of the same proceeds and the invention will be best understood from a consideration of the following detailed description taken in connection with the accompanying drawings forming a part of the specification, with the understanding, however, that the invention is not to be limited to the exact details of construction shown and described since obvious modifications will occur to a person skilled in the art.

In the drawings:

Figure 6 is a view in plan of the blank as received at the former machine with a previously produced trim strip forming a part thereof, the blank further being lined to indicate the cuts for producing the stave pieces.

Figure 7 is an end edge view of the blank as shown in Figure 6.

Figure 8 is a view in perspective, looking at the inside face, of a stave piece from which two incomplete staves are formed and showing the arcuate line of cut as followed by the cutting saw.

Figure 9 is a view looking at the smaller end of the stave piece shown in Figure 8 and illustrating the angle of the beveled longitudinal edges thereof.

Figure 10 shows in an end view, the top incomplete stave pieces as produced from the blank shown in Figure 8.

Figure 11 is a view illustrating conventionally convex and concave planers by which the flat faces of the incomplete stave pieces are planed to a transverse arcuate contour.

Figure 12 is a view illustrating the manner of making the first cut of a blank according to one form of procedure where the blank includes in its make-up the trim strip resulting from the first cutting of the blank formed as illustrated in Figure 2.

Figure 1:
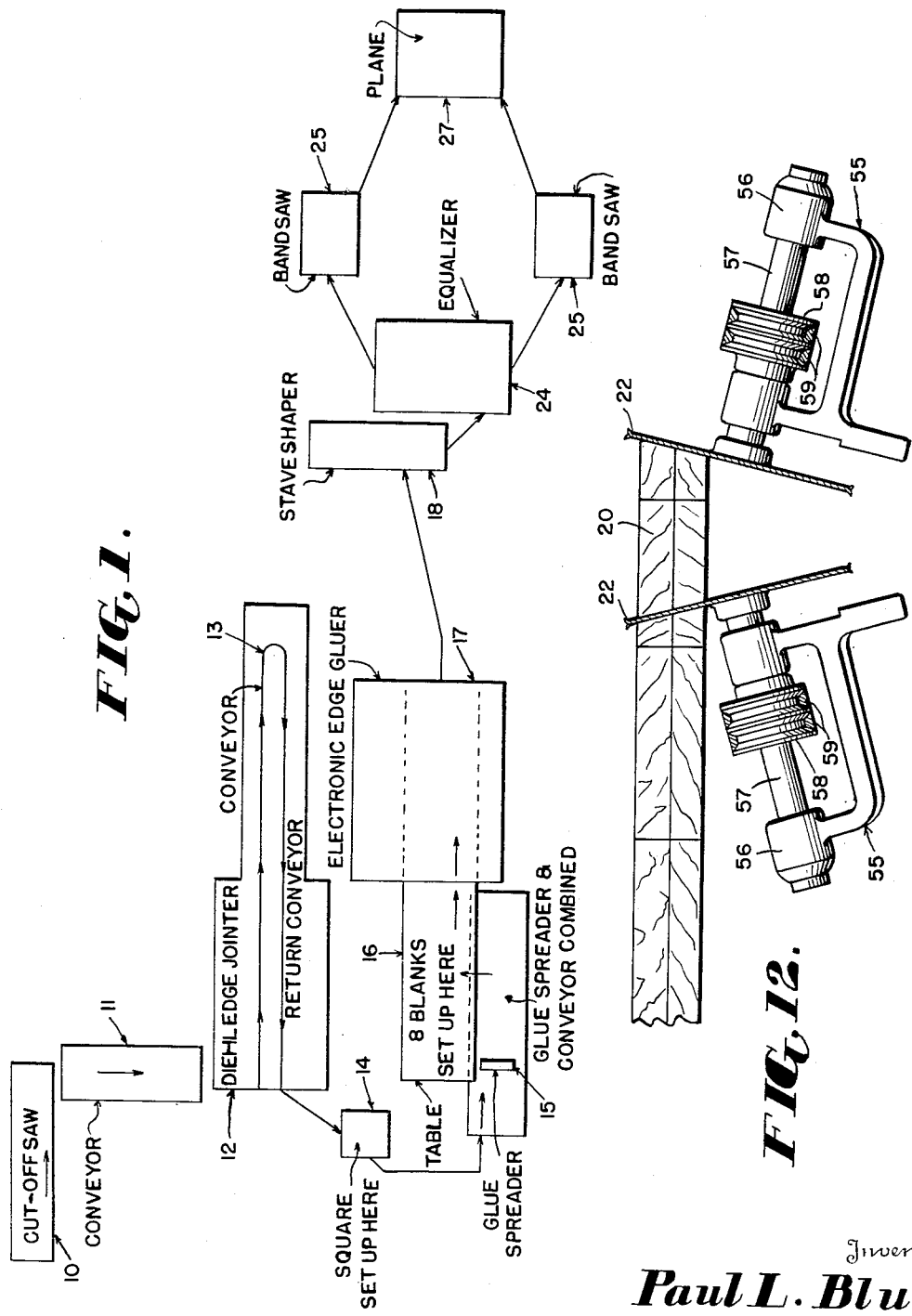
Figure 1 is a flow chart showing the different operating stations in carrying out the herein described method in the progress of the material from the stage in which it is received to the completed stave.

As hereinbefore set forth in practicing the present invention use is made of waste pieces of the material such as may be obtained from any one of numerous window and door frame or sash manufacturing mills, such waste pieces, which are of Ponderosa pine, customarily running from fifteen and one-half to sixteen and one-half inches in length and having a width of from two and one-half inches to five inches or more and a thickness of from one inch to one and five thirty seconds inches.

It will, of course, be understood that the present method is not restricted to the use of the waste pieces of this particular type since longer pieces of material may be employed by reducing them to the proper lengths but the present method is of particular economic importance to the art in the fact that the usual sources of available long length material are decreasing due to the depletion of forests of the correct type of wood and the present method was accordingly devised with a view to using the material which heretofore had been useless and at the same time reducing the wastage of such material to a minimum.

In carrying out the method, where it is necessary the pieces of material are reduced to the proper thickness and the pieces are then run through a cut-off saw machine, diagrammatically shown and designated 10 in the chart, where such pieces are given the proper length for the particular size tub to be constructed from the finished staves.

Standard size butter tubs holding sixty five pounds of butter measure about fourteen and seven-eighths inches in diameter inside of the top and about twelve inches inside diameter at the bottom and approximately thirteen and five-eighths inches deep. The finished stave for a tub of this size will be approximately fourteen and fifteen-sixteenths inches long. Tubs of smaller size may, however, be made from staves produced according to the present invention, such smaller tubs being of a capacity to hold five, ten, twenty or thirty pounds of material. Accordingly further reference to specific sizes will not be made, it being understood that the method is applicable to any size desired but it will be apparent that if at the cut-off saw a piece of material is produced which is of insufficient length to make a tub of the maximum size, it may be employed for the production of staves for a smaller size receptacle.

After reducing the material to the proper length at the cut-off saw 10 it is carried by conveyor 11 to an edge jointer machine 12 where the edges of the material are shaved or planed square and true and run parallel to the grain.

After having the edges squared, the pieces of material are carried by a suitable conveyor 13 to a set-up bench 14 where they are assembled into a blank of approximately square outline and having, where the pieces are designed for use in making the maximum size tub, a length of about fifteen and a quarter inches and a width of about sixteen and one-half inches. This assemblage of pieces after being glued up will be hereinafter referred to as the blank.

The set up or assembled pieces for the blank are then transferred to the glue spreader 15 where the edges of the pieces have glue applied to them and the pieces are replaced in the previously assembled relation on a blank set up table 16. This table is of sufficient size to accommodate eight such blanks in two rows of four each and these two rows of blanks are moved one behind the other into and through a glue dryer 17 of the electronic type where the glue is set.

Preference is had for a glue dryer of the electronic type because of the rapidity with which the glue is set to full holding strength, such a condition being obtained in approximately nineteen seconds in an apparatus of this character. Such electronic glue setting devices are of standard construction and well known in the trade and accordingly it is not believed that any detailed illustration or description of the same is required in connection with the setting forth of the present method.

Following the operation of setting the glue, the blanks go to the stave shaper which in the flow chart is diagrammatically shown and designated 18. The specific construction and operation of this shaper will be hereinafter more fully set forth.

Figure 2:
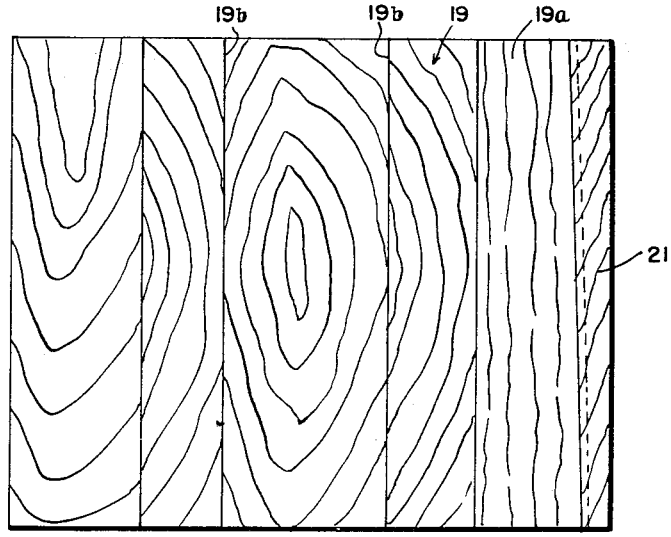
Figure 2 is a plan view of the blank as made up from the different pieces of material and showing how the first trim piece is produced in the making of the initial cut of the blank.
Figure 3:
Figure 3 is an edge view of the blank as illustrated in Figure 2.

The blank as now set up ready to be operated upon by the stave shaper appears approximately as shown in Figures 2 and 3 where it is generally identified by the reference numeral 19, the individual pieces making up the blank, being designated 19a. The glued up joints between the pieces 19a are designated 19b.

The blank upon reaching the stave shaper is sawed by means of a pair of rotating circular saws constructed and arranged in a novel manner as hereinafter set forth to produce stave pieces longitudinally tapered and having side edge or longitudinal edge bevels, from each of which tapered and beveled stave pieces, two staves are subsequently produced as hereinafter set forth.

The circular saws of the stave shaper are mounted at opposite sides of a movable carriage guide to rotate on axes which converge upwardly across the top of the carriage path and the blank is fed to the saws while being held at an inclination so that the higher end of the blank is engaged first by the higher parts of the saws and the lower part of the blank passes between the convergent or toed in lower portion of the saws thereby cutting the stave piece on a taper and with its longitudinal edges beveled. The construction and operation of the sawing mechanism is described and claimed in my copending application Serial No. 160,904, filed May 9, 1950, now Patent No. 2,673,585, of March 30, 1954, of which the present application is a division. In accordance with the present method, when the initially formed blank is first fed to the saws there will be produced one, two stave thick piece 20 having the proper bevel and taper and a trim piece 21.

Figure 4:
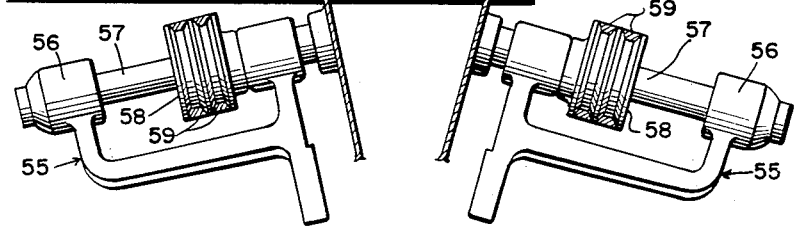
Figure 4 is a view illustrating the manner of making the first cut of the blank according to one procedure.

In Figure 4 the angular disposition of the saws, designated 22, is shown together with the trim piece 21 and the first of the tapered stave pieces 20. This view is taken looking at the low or back edge of the blank and toward the high edge. As will be readily seen in the making of this first cut on the blank, the left hand saw 22 will form or leave the right hand edge of the portion of the blank remaining after removing the piece 20, cut to the correct bevel or taper, such tapered edge being designated a.

Figure 5:
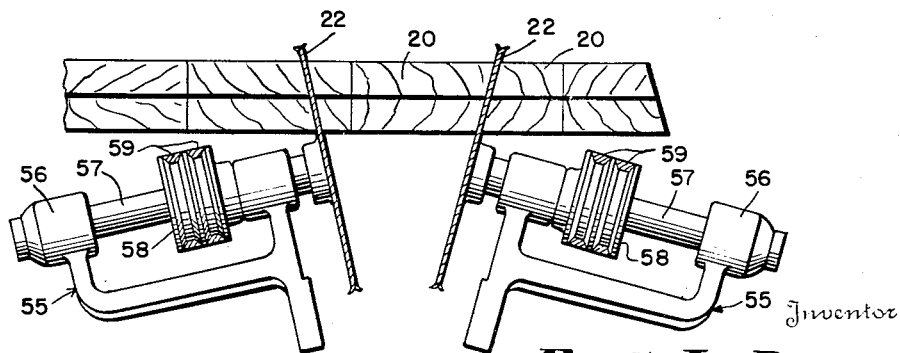
Figure 5 is a view illustrating the manner of making the second cut of the blank according to the alternative procedure which may be followed.

It will be readily seen by reference to Figure 4, and also to Figure 5, that the toe-in of the saws due to the angle of the axis of rotation or the supporting mandrils therefor, produces the correct edge bevel at each side of the blank piece and also the leading or advancing edge of the blank, engaging the saws at a higher point or elevation than the rear end or trailing edge of the blank, produces the correct longitudinal taper for the blank piece 20.

The trim piece 21 which is produced from the initially formed blanks, that is the blanks formed originally from the straight pieces 19a, is not discarded or wasted. When a number of blanks have been cut in the manner thus far described so that an equal number of these trim pieces are produced, such trim pieces are sent back to the table 16 where the eight blanks are set up as previously described. Here these trim pieces are edge glued to the squares and, as will be readily seen, the blanks thereafter coming from the electronic edge gluer to the stave shaper will have one edge correctly edge beveled and tapered. Such a blank is shown in plan in Figure 6 and in edge elevation in Figure 7. In these figures the properly beveled and tapered edge face of the applied trim piece is designated b.

Consideration will now be given to using blanks set up as shown in Figures 6 and 7, having the trim piece 21 from a preceding blank forming a part thereof and edge glued to one side as indicated at 21a, whereby such blank, here generally designated 19c goes to the stave shaper with one edge properly beveled and tapered. Two ways may now be employed for cutting the stave pieces from the blanks 19c by means of the inclined saws and by feeding the blank to the saws in the manner previously set forth.

The first of these two ways of cutting the blank as shown in Fig. 12 would be to feed the blank to the saws, after properly setting the blank in position, with the advancing edge higher than the trailing edge as before stated, so that the already formed beveled and tapered edge b will move across the inclined face of the right hand saw and the left hand saw will cut longitudinally through the blank. In this procedure the right hand saw performs no work and a single stave piece 20 is produced. The remaining blank piece from which the single stave piece has been cut, is then turned upside down end for end and again fed forwardly to be operated upon by the single left hand saw, the right hand saw again following the right hand inclined or beveled edge face of the work. In other words each time one stave piece is sawed from the blank, the blank is reversed or turned over end for end as stated before the next stave piece is cut off, in order to obtain the correct bevel and taper.

The second way of cutting the blank, which may be employed, is to set the blank over farther to the right with respect to the saws, suitable guide stops being employed for both of these procedures, as set forth in my aforesaid patent, so that both saws now function and two stave pieces are produced or cut from the blank at a time, illustrated in Figure 5. With this manner of proceeding it will also be apparent that the need for reversing or turning the blank is avoided, the blank merely being run through again in the same manner so as to cut two more stave pieces therefrom.

The stave piece 20 produced in either of the two ways above set forth, is shown in perspective in Figure 8 and from this tapered piece two completed or finished staves are eventually produced as hereinafter set forth.

After cutting from each blank as many stave pieces as possible, or four pieces, a remaining strip is obtained which corresponds to the original trim strip and which may be sent back to the blank assembly or set up table to be added to the blanks in the same manner as the trim strip 21, this last named or remaining strip being designated 23. Thus it will be seen that the pieces cut from the blanks in the formation of the stave pieces, namely the trim piece 21 and the remaining or tail piece 23, are not wasted but go into the making of additional blanks and give to such additional blanks an already beveled and properly tapered edge form which becomes one longitudinal side or edge of a subsequently produced stave piece.

It will be noted that in carrying out the method to the point described, after the individual pieces 19a have been cut to the proper length there is nothing removed from the blank which is discarded or wasted, except the sawdust, and the stave pieces 20 while properly tapered and beveled, have their inner and outer faces flat and parallel.

From the stave shaper, the stave pieces 20, each of which is of a thickness to have two staves produced from it, proceed to what is termed the equalizer, which is designated 24, where the staves are fed horizontally edgewise to a pair of spaced parallel saws which cut the stave piece to the proper length.

From the equalizer the properly lengthened stave pieces move to band saw machines 25 which forms the subject matter of my Patent No. 2,682,285, where the stave is fed or moved in an arcuate path to the vertical band saw, while being maintained vertically on its end. The stave piece is thus cut or divided longitudinally into the pieces, along an arcuate path from one longitudinal edge to the other, such cut line or line of division being shown in Figure 9 and designated 26. There are thus produced two pieces of the form shown in Figure 10, designated 20a and 20b. As shown the piece 20a has one side face transversely convex as indicated at 20e while the other piece has one side face transversely concave as indicated at 20d. Each of these pieces 20a and 20b constitutes an incomplete stave.

Completion of the staves is effected by feeding the pieces through suitable planers described and claimed in my Patent No. 2,682,285, the planer station being designated 27 in the flow chart and representing the last stage of the method. At the planer 27 there is provided a convex planer unit 28 which gives the convex transverse curvature to the previously flat side of the incompleted stave 20b and a concave planer which gives a transversely concave face to the previously flat side of the incomplete stave 20a.

The two planer units 28 and 29 may form a part of a single machine by having the units mounted upon a single shaft 30 which operates in conjunction with a parallel shaft 31 which carries convex and concave feed rollers 28a and 29a respectively.

The planers are here more or less conventionally shown and it will be understood that any suitable supporting means may be provided for the rotary shafts 30 and 31 and also suitable means for rotating these shafts at the desired speed as shown in my Patent No. 2,682,285 above referred to.

As previously stated the sawing mechanism by which the two stave pieces 20 are cut from the blank and given the proper taper and bevel is illustrated in detail and claimed in my Patent No. 2,673,585. In this connection, where the stave piece is formed for the production of staves designed to be used in a tub of the larger size the piece is given approximately a one and a half degree taper on each side from end to end and an edge angle of 15° front to back as indicated in Figures 8 and 9. In the sawing mechanism there are provided two spaced arbor frames 55 each of which includes in its structure the two spaced, axially aligned bearings 56 which support the saw arbor 57. Each of these arbors carries the V-belt pulley 58 which is in driving connection by means of V-belts 59 with a suitable driver pulley, not shown.

As shown the arbors 57 have their axes upwardly convergent and intersect in a vertical plane extending longitudinally of the center of the support on which the work piece is held. The inner ends of these arbors, however, terminate short of this central plane and each carries upon such end the circular saw 22 hereinbefore referred to. While these saws 22 are in downwardly convergent planes the bottom edges of the saws are spaced quite far apart while the top parts of the saws are, of course, a considerably greater distance apart for the passage therebetween of the support for the work piece.

As previously set forth the stave piece 20 will have produced from it two complete staves of proper transverse curvature, taper and longitudinal edge bevel for final assembly into a tub or pail. As previously set forth the trim piece 21 which has one edge properly beveled and the other edge straight or square with the top and bottom surfaces, goes back to the blank assembly table and forms the outer side piece of another blank, as illustrated in Figures 6 and 7 so that when this blank comes to the stave shaper machine it will have one side already cut to the proper taper and bevel. This is another important feature of the present invention in providing for economy in the raw material since initial trim pieces are not discarded but go into the making of subsequent blanks and, because of the fact that such subsequent blanks come to the stave shaper machine with an edge already cut and beveled, a saving in time is effected in producing the desired stave pieces from such blank.

After the stave pieces have been produced in the manner stated they are cut to length by a suitable mechanism.

Following the squaring of the ends of the stave pieces, the pieces are divided along the arcuate line 26 as shown in Figure 9 by means of the special band saw mechanism forming the subject matter of my Patent No. 2,682,285 previously referred, producing the two incomplete staves 20a and 20b, shown in Figure 10.

The procedure followed after the formation of the two incomplete staves by the operation of the band saw has been previously set forth, namely, the running of the incomplete staves through a planer such as that conventionally illustrated in Figure 11 and which comprises a cutter head carrying convex blades in cooperation with a concave feed roller and a second cutter head on the same shaft as the first and carrying concave cutter blades which cooperate with a convex feed roller. This final operation cuts away the flat faces of the two incomplete staves so as to bring the completed staves to transverse arcuate form and to one thickness, in which condition they are then ready to be assembled to form the completed tub or pail.

From the foregoing it will be readily apparent that there is provided by the present invention a new and novel method of forming tub and pail staves by which a great economy can be effected in the manufacture of such articles by the use of material which has heretofore been wasted. Also according to the present method the reclaimed scrap material is assembled and sawed in a novel manner whereby considerable economy is effected through the integration into the set up blanks of initial trim pieces which become a part of the finished stave piece and the resulting staves produced therefrom.

I claim:

1. The improved method of producing tub and pail staves which comprises the steps of preparing a blank having a length greater than a finished stave and a width greater than a finished stave, then sawing the blank lengthwise along two convergent lines and in downwardly convergent planes to produce a stave piece of desired longitudinal taper and longitudinal edge bevel, cutting the stave piece to length, then dividing such stave piece lengthwise on an arcuate line lying between the side faces of the piece and extending from and through one beveled edge to the other to produce two incomplete staves each having one transversely curved finished face, and finally planing the other face of such incomplete stave to a transverse curvature substantially paralleling the said one finished face thereof.

2. The improved method of producing tub and pail staves from a plurality of wood pieces which may be individually of insufficient width for such use, which method comprises edge squaring a number of such pieces having a length greater than the desired finished stave, assembling and edge gluing such pieces together to form a flat blank having a width greater than the combined widths of a number of finished staves, then sawing the blank lengthwise along two convergent lines and in downwardly convergent planes to produce a stave piece of desired longitudinal taper and longitudinal edge bevel, repeating such sawing operation to produce the maximum number of pieces from the blank, cutting said pieces to the desired length of finished staves, cutting each piece lengthwise along a curved transverse line to provide two partially completed staves each having one side surface flat and the other side surface transversely curved and finally shaping said flat surfaces to the desired curvature to provide complete staves.

3. The method as set forth in claim 2 which includes the step of adding to subsequently made up blanks a trim strip resulting from the cutting of the first stave piece, said trip strip having a beveled edge and being assembled in said subsequently made up blank to form one longitudinal border with its beveled edge positioned to provide a ready formed beveled edge of the first tapered stave piece cut from the blank.

4. In the manufacture of tub and pail staves the novel method for utilizing mill scrap wood pieces having a length greater than the staves but of widths insufficient for such use individually, said method comprising assembling a number of such pieces in edge to edge relation, gluing the assembled pieces together to form a flat blank having a width greater than the combined widths of a number of staves, then sawing the blank in one operation along two longitudinally convergent lines and in downwardly convergent planes to produce a longitudinal trim strip and a stave piece, the stave piece having the longitudinal taper and longitudinal edge bevel of a stave and said strip having one longitudinal edge of the same bevel as a stave, employing said trim strip as a border piece in the making up of a subsequent blank with the beveled edge of the strip disposed outwardly and sawing said subsequent blank longitudinally along one line convergent with said strip edge and in a plane convergent with the plane of the bevel of such edge to produce a stave piece from which a completed stave may be produced.

5. The method as set forth in claim 4, with the additional steps of dividing the stave piece through its length on an arcuate line lying between the side faces of the piece and passing through the beveled edges thereof to produce two incomplete staves each having one finished transversely curved face, and then planing the other face of each stave to a transverse curvature paralleling the said one face.

References Cited in the file of this patent

UNITED STATES PATENTS

| | | |
|---|---|---|
| 407,019 | Krauser | July 16, 1889 |
| 1,677,822 | Gulliford | July 17, 1928 |
| 2,275,975 | McGlove | Mar. 10, 1942 |
| 2,560,992 | Schlueter | July 17, 1951 |